US011181735B2

(12) United States Patent
Ricks et al.

(10) Patent No.: US 11,181,735 B2
(45) Date of Patent: Nov. 23, 2021

(54) OPTIC AND ASSEMBLY FOR REDUCED REFLECTIONS

(71) Applicant: TDG Acquisition Company, LLC, Rochester, NY (US)

(72) Inventors: Theodore K Ricks, Pittsford, NY (US); Chris P Brophy, Pittsford, NY (US); Nathan E Burdick, Rochester, NY (US)

(73) Assignee: TDG Acquisition Company, LLC, Henrietta, NY (US)

( * ) Notice: Subject to any disclaimer, the term of this patent is extended or adjusted under 35 U.S.C. 154(b) by 188 days.

(21) Appl. No.: 16/277,386

(22) Filed: Feb. 15, 2019

(65) Prior Publication Data

US 2019/0250400 A1 Aug. 15, 2019

Related U.S. Application Data

(60) Provisional application No. 62/630,900, filed on May 15, 2018.

(51) Int. Cl.
*G02B 27/00* (2006.01)
*G02B 27/01* (2006.01)
(Continued)

(52) U.S. Cl.
CPC .......... *G02B 27/0018* (2013.01); *G02B 5/04* (2013.01); *G02B 5/30* (2013.01); *G02B 27/0172* (2013.01);
(Continued)

(58) Field of Classification Search
CPC .. G02B 27/0018; G02B 27/0172; G02B 5/04; G02B 27/10; G02B 27/283; G02B 27/14;
(Continued)

(56) References Cited

U.S. PATENT DOCUMENTS 4,178,072 A 12/1979 Rogers
5,067,805 A 11/1991 Corle et al.
(Continued)

FOREIGN PATENT DOCUMENTS

JP 08-050251 2/1996
JP 2007286317 11/2007

OTHER PUBLICATIONS

English translation of JP2007286317, obtained from the JPO website on Nov. 4, 2020.*

(Continued)

*Primary Examiner* — Kristina M Deherrera
(74) *Attorney, Agent, or Firm* — Metz Lewis Brodman Must O'Keefe LLC

(57) ABSTRACT

An optic providing reduction in secondary or ghost images includes a beam splitter, a reflective surface, and at least one baffle therebetween. A transmissive surface may be located between the beam splitter and the reflective surface. The baffle is positioned to intercept internally reflected ghost rays while being substantially parallel to outside light rays along a line of sight of the viewer, permitting use in see-through optics. The baffles may be formed of diffusing structures, light absorbing material, and combinations of both. Baffles intercept and scatter or absorb ghost rays to the exclusion of projected image rays that provide a desired projected image which are internally reflected through the optic. An assembly including such optic integrated with a wearable vision system, such as a head-mounted display, is also disclosed for near-eye application.

24 Claims, 8 Drawing Sheets

(51) Int. Cl.

| | |
|---|---|
| *G02B 27/14* | (2006.01) |
| *G02B 27/09* | (2006.01) |
| *G03B 13/04* | (2021.01) |
| *G02B 5/30* | (2006.01) |
| *G03B 21/20* | (2006.01) |
| *G02B 5/04* | (2006.01) |
| *G02B 27/28* | (2006.01) |
| *G02B 27/10* | (2006.01) |
| *G02B 5/02* | (2006.01) |
| *G02B 5/22* | (2006.01) |

(52) U.S. Cl.
CPC ......... *G02B 27/0977* (2013.01); *G02B 27/10* (2013.01); *G02B 27/14* (2013.01); *G02B 27/283* (2013.01); *G03B 13/04* (2013.01); *G03B 21/2006* (2013.01); *G03B 21/2066* (2013.01); *G02B 5/021* (2013.01); *G02B 5/22* (2013.01); *G02B 2027/015* (2013.01)

(58) Field of Classification Search
CPC ........ G02B 27/0977; G02B 5/30; G02B 5/22; G02B 5/021; G02B 2027/015; G02B 6/353
USPC ......................................................... 359/601
See application file for complete search history.

(56) References Cited

U.S. PATENT DOCUMENTS

| | | |
|---|---|---|
| 5,835,276 A | 11/1998 | Asai et al. |
| 5,838,504 A | 11/1998 | Ichikawa et al. |
| 6,342,980 B1 | 1/2002 | Omuro |
| 7,133,207 B2 | 11/2006 | Travers |
| 7,350,928 B2 | 4/2008 | Liao et al. |
| 2002/0089744 A1 | 7/2002 | Myers |
| 2005/0168376 A1* | 8/2005 | Coward ............. H01Q 21/0012 342/22 |
| 2005/0180021 A1 | 8/2005 | Travers |
| 2007/0019165 A1 | 1/2007 | Ishikura |
| 2010/0066926 A1 | 3/2010 | Tanijiri |
| 2010/0149073 A1 | 6/2010 | Chaum et al. |
| 2011/0194163 A1 | 8/2011 | Shimizu et al. |
| 2015/0260988 A1 | 9/2015 | Sugihara et al. |
| 2016/0282578 A1* | 9/2016 | Childers .............. G02B 6/0001 |
| 2018/0011326 A1 | 1/2018 | Ishizaki |

OTHER PUBLICATIONS

International Searching Authority; International Search Report and Written Opinion of the International Searching Authority; International Application No. PCT/US19/18238; Patent Cooperation Treaty; pp. 1-9; publisher United States International Searching Authority; Published Alexandria, Virginia, US; copyright and dated May 1, 2019; (9 pages).

\* cited by examiner

OPTIC AND ASSEMBLY FOR REDUCED REFLECTIONS

CLAIM OF PRIORITY

The present application claims priority to and the benefit of previously filed application having Ser. No. 62/630,900 filed on Feb. 15, 2018, the contents of which are incorporated herein by reference in its entirety.

FIELD OF THE INVENTION

The present invention relates to the field of optics. More particularly, the invention relates to optics, such as see-through optics, having features that reduce unwanted reflections that cause secondary or ghost images, and the inclusion of such optics in head mounted displays.

BACKGROUND

Head mounted display (HMD) systems with see-through optics is a quickly developing area of optics. Digital images are produced and presented to the eye of a user through a see-through optic, which can be mounted to glasses such as safety glasses. However, the resulting image may be occluded with secondary images, also known as "ghost images," that interfere with the quality of the digital image. The ghost images appear at the top and bottom of the image and are out of phase with and/or inverted compared to the actual image being presented. The ghost images may partially obscure the actual image, and create blurring and a lack of clarity in the resulting image.

Known techniques for reducing ghost images include applying coatings to exterior surfaces of optical elements, such as prisms and lenses, which block large portions of light. For instance, in United States Patent Application Publication No. 2007/0019165, masking areas of total internal reflectance (TIR) prisms with a shielding coating having markedly reduced transmissivity and reflectance properties reduces stray light. Such shielding coating is applied to large portions of the exterior surfaces of the TIR prism and condenser lens that is spaced apart from the TIR prism. However, because the shielding blocks large portions of light rays, a reduced amount of light is permitted through to create the resulting image. This reduces the brightness of the resulting image. The space between the TIR prism, condenser lens, and the reflecting mirror also create additional media through which the light rays must travel, allowing for greater deviation and reduced overall clarity in the resulting image.

In U.S. Pat. No. 5,835,276, a plate is interposed between prisms in a compound prism. The plate has a light blocking portion and a diaphragm opening that permits light through. The light blocking portions of the plate reduce ghost images by blocking the corresponding light rays. Uneven portions are added to the light blocking portions to further reduce ghost images. Here too, however, the plate covers much of the prism surfaces and blocks a significant portion of light compared to the size of the diaphragm opening. This blocks relevant light rays forming the resulting image as well as ghost images, and reduces the brightness of the resulting image. U.S. Pat. No. 5,838,504 discloses projections and depressions to create an uneven surface that scatters incident light, reducing the perception of the corresponding image. However, this also scatters much of the other light corresponding to the relevant image to be presented, reducing the clarity of the resulting image as well.

These previous techniques for blocking or interfering with ghost images also undesirably affect the real images as well. Exterior coatings applied to prisms affect the entire prism, and therefore impede all light passing therethrough, not just the ghost images. Blocking plates avoid some of this problem, but still restrict large portions of relevant light, reducing the brightness and overall effectiveness of image transmission. Projections and depressions scatter any incident light, including the relevant light conveying real images. Therefore, there remains a continuing need for optical systems that provide a quality digital image displayed with a minimum of occlusion. It is desirable to create an optically see-through system to meet this need, and which may be used in assemblies such as miniature HMDs and other optical systems.

SUMMARY

An optic is disclosed that includes certain structural features which significantly reduce and/or eliminate secondary or ghost images in a resulting desired real or virtual image without also occluding the desired image. The optic does not depend on high-tolerance features or exterior surfaces to accomplish this reduction. Rather, the optic includes baffle(s) located internally within the optic and which are positioned at oblique angles to projected light rays being blocked and substantially parallel to outside light rays that are parallel to a vision axis. The baffles therefore do not obstruct the outside light rays passing through the optic which are viewed by a user, and so do not interfere with viewing images of the surrounding environment through the optic while secondary or ghost images are reduced. The optic described herein may preferably be a see-through optic that does not occlude the line of sight or peripheral vision of the viewer, though it is contemplated that it be any optic having prism(s). The optic may be incorporated into an assembly for virtual or augmented imaging, such as a HMD.

As described in further detail below, the optic is may include a single prism or may be a compound optic having multiple prisms contacting one another and which may be bonded together. The optic includes a beam splitter that provides transmission of at least a portion of incoming light rays to continue through the optic, and may further provide reflectance of certain other light rays out the optic. A reflective surface reflects the transmitted light rays internally back into the optic toward the beam splitter, which then reflects the light rays toward the viewer. In some embodiments, the optic may include a polarizing surface, which may be the same or different from the beam splitter.

The optic includes at least one baffle that intercepts and/or redirects the light rays corresponding to secondary or ghost images. The baffle(s) are positioned within the optic at specific locations to target and interfere with ghost light rays while leaving the image light rays unaltered, thereby maximizing the amount of light for the resulting image.

In certain embodiments, the baffles may be light absorbing baffles made of any material that absorbs light in the target frequency, such as visible light in the range of 400-700 nm or infrared (IR) light used in night-vision applications. Examples include opaque or black paint and other similar coating materials. The light absorbing baffles are located at the distal and proximal surfaces of the optic, and span at least part of the width of the optic. In some embodiments, the optic may include a transmissive surface located between the beam splitter and reflective surface that permits light rays to pass through substantially unaltered. Light absorbing baffles may be included along portions of the transmissive surface, such as located between contacting prisms of a compound optic and at the distal and proximal edges of the optic. In a preferred embodiment, the light absorbing baffles may be strips disposed along the edges of the transmissive surface at the distal and proximal edges, and run substantially the entire width of the optic. They are located and dimensioned to intercept the light rays that cause secondary or ghost images and absorb these light rays before they can exit the optic for viewing. Ghost images are therefore reduced in the resulting image presented to the viewer. Because the light absorbing baffles are located along the transmissive surface and between adjacent contacting prisms, they are paper-thin when viewed from the proximal surface of the optic, where outside rays of light carrying the images of the surrounding environment pass through the optic. Therefore, the light absorbing baffles do not block these outside rays, and the images of surroundings are faithfully transmitted through the optic without occlusion. Such images of the surroundings may include anything visible in the outside world surrounding the viewer.

In certain embodiments, the baffles are diffusing structures located on proximal and/or distal surfaces of the optic between the beam splitter and reflective surface. The diffusing baffle(s), which may be a notch, groove or other similar feature, extend inwardly into the optic from the proximal and/or distal surface and may include uneven surfaces. These uneven surfaces scatter incident light, diffusing the image carried by the light rays. The diffusing baffle(s) is located to intercept light rays corresponding to secondary or ghost images, thereby scattering them as they exit the optic. The light rays are scattered to such a degree that the ghost images are no longer perceptible in the resulting image. The diffusing baffle(s) may be formed in the optic, such as by being ground or cut out of the appropriate prism or by being molded therein when forming the prism. The dimensions of the diffusing baffle(s) are preferably minimal, thereby permitting outside light rays to pass through the optic unobstructed.

In certain embodiments, the baffles may be a combination of diffusing structure with light absorbing material. These combination baffles provide the benefits of absorbing the light rays corresponding to ghost images, thus preventing them from continuing on to the eye for viewing, while also being easier to manufacture into a prism than having to create a compound optic. Such combination baffles may be used with any type of optic, and may be particularly useful in single prism optics.

The invention is also directed to an assembly including the optic as described above together with an image source and a vision system. For instance, such assemblies may be HMDs in which the optic is associated with a vision system such as glasses, safety glasses, goggles, or other headgear. A control unit having a processor is connected to the image source, such as an LCD or OLED display, which provides the image and light to the optic. A mounting unit may selectively connect the image source to the vision system, such as to a frame of glasses, for attachable and detachable use.

The optic and assembly, together with their particular features and advantages, will become more apparent from the following detailed description and with reference to the appended drawings.

DESCRIPTION OF THE DRAWINGS

Like reference numerals refer to like parts throughout the several views of the drawings.

DETAILED DESCRIPTION

Figure 1:
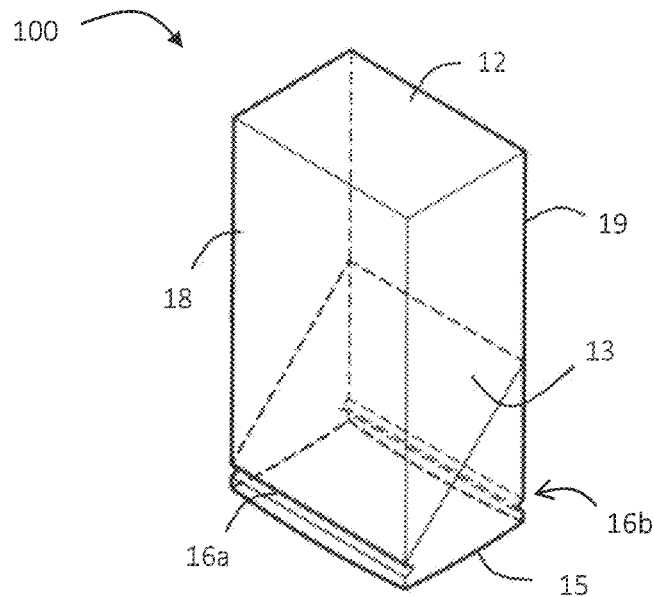
FIG. 1 is an isometric view of a first embodiment of the optic of the present invention having diffusing baffles.

As shown in the accompanying drawings, the present invention is directed to an optic having certain structural features to reduce internal reflections that produce "ghost images," and near-eye display assemblies including such optics. As used herein, the term "ghost image" refers to an unwanted or undesirable secondary image that may at least partially occlude, overlap, obscure or otherwise reduce or interfere with the clarity of a desired image. Such ghost images are produced by ghost rays, which are discussed in greater detail later. In contrast, a "desired projected image" is the image intended to be projected through the optic for viewing and result from image rays, discussed in greater detail later. The desired projected image may be a two-dimensional or three-dimensional image presented to the viewer. The structural features in the optic which provide the reduction in reflections producing ghost images are baffles that are specifically located to selectively block ghost rays while leaving the projected image rays unmodified. The result is a much sharper, more clear desired image.

The optic 100 of the present invention may be any type of optic suitable for viewing images. Preferably, the optic is one which exhibits TIR, in which incident light rays are reflected internally within the optic. In at least one preferred embodiment, the optic 100 may be a see-through optic which permits outside light rays 53 to pass through the optic 100 so the viewer can see their surroundings while simultaneously viewing a desired projected image 70 through the optic 100. In other embodiments, the optic 100 may be an occluded optic. Accordingly, the optic 100 may be used in virtual reality (VR) and augmented reality (AR) settings.

The optic 100 may be of any suitable size, such as in the range of 1 mm-1 m. In at least one embodiment, the optic 100 may measure about 22-23 mm in height, about 13-14 mm wide, and about 9-10 mm in depth in one illustrative example. Preferably, the optic 100 is of a size suitable for use in a wearable near-eye display assembly such as an HMD, discussed in greater detail below. The particular dimensions of the optic 100 will depend on the geometries desired, including but not limited to surface angles and thickness of the optic 100.

As seen throughout the Figures, the optic 100 includes at least one prism 20 through which light passes. The prism 20 may be made of any suitable material, such as optical grade glass or plastic, such as N-BK7, having sufficient geometries and refractive qualities to be suitable for optics applications, such as having a birefringence of <10 nm/cm. As noted above, the prism 20 is preferably a prism having internal reflective properties. In certain embodiments, the optic 100 may be a monolithic optic having a single prism 20. In at least one other embodiment, the optic 100 may be a compound optic having a plurality of prisms, such as a first prism 20, second prism 30, third embodiment 40, etc., as shown in FIGS. 1-3, 6-7A and 11-13. Any number of prisms may be present in the optic 100, and the various prisms 20, 30, 40 may be made of the same or different materials from one another and may have the same, similar, or different optical properties, such as reflective and refractive properties, as one another. The exterior edges of the prisms 20, 30, 40 may be finely ground or polished for transmissibility, such as but not limited to surface irregularities of <0.5-1 fringe, and may further have anti-reflective coating applied to the surfaces to inhibit glare.

Compound optics 100 may be formed by the combination and bonding or adhering of various prisms to each other with no space or distance between the prisms. The prisms may therefore be positioned adjacent to, contiguous with and contacting each other to form the composite optic 100. Preferably, adjacent prisms are index matched to one another to maintain light angles between adjacent prisms for optical integrity. For instance, in the embodiments shown in FIGS. 1-2 and 11-12, the optic 100, 100" may be formed of a first prism 20 and a second prism 30. In other embodiments, such as in FIGS. 6-7A, the optic 100' may be formed of a first prism 20, second prism 30 and third prism 40 bonded or otherwise formed together. These are but a few examples and are not intended to be limiting.

Figure 5A:
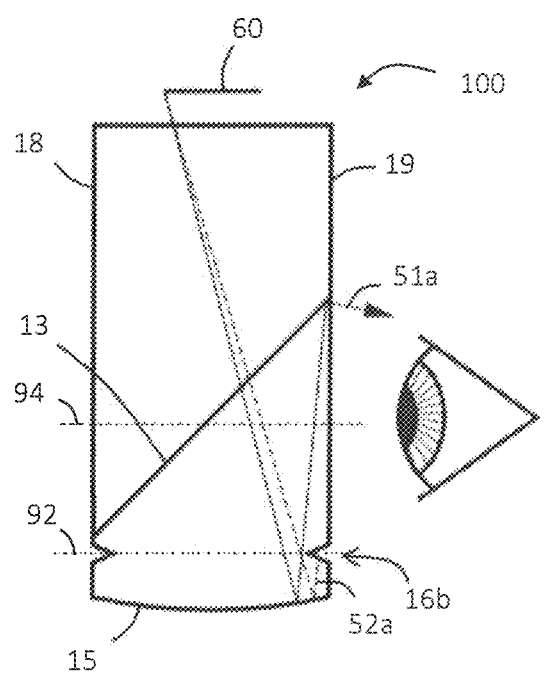
FIG. 5A is a diagram showing a ray trace of image rays and ghost rays originating from a distal edge of a light source passing through the optic of FIG. 1, blocking ghost rays.
Figure 5B:
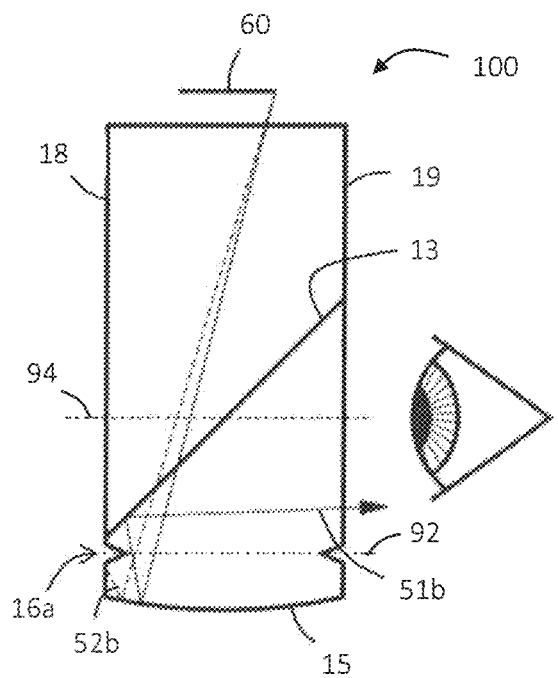
FIG. 5B is a diagram showing a ray trace of image rays and ghost rays originating from proximal edge of a light source passing through the optic of FIG. 1, blocking ghost rays.

The optic 100 includes a number of surfaces which interact with light rays in transmitting or reflecting the light rays to achieve the resultant desired projected image 70. In some embodiments, the optic 100 may include a light incident surface 12, as seen in FIGS. 1-3 and 5A-5B, through which projected light rays and corresponding projected images from an image source 60 initially enter the optic 100. The light incident surface 12 is therefore entirely transmissive to allow all incident projected light to enter the optic 100. The light incident surface 12 is preferably perpendicular to a proximal surface 19 that is positioned closer to the viewer when using the optic 100 and an opposing distal surface 18 that is positioned further away from the viewer when using the optic 100. FIGS. 5A and 5B demonstrate the proximal and distal surfaces 19, 18 of the optic 100 in relation to a symbolic diagram of an eye, which represents the viewer but is not to scale with the optic 100.

Figure 2:
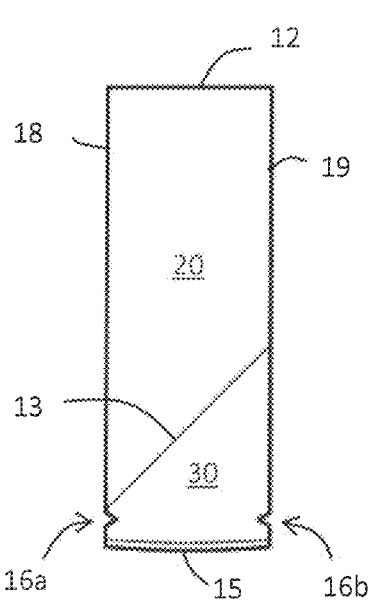
FIG. 2 is a side elevation view of the optic of FIG. 1.

The optic 100 also includes a beam splitter 13 spaced apart a preselected distance from the light incident surface 12 and at an angle relative to the distal and proximal surfaces 18, 19. For instance, the center of the beam splitter 13 may preferably be spaced about 15.5 mm from the light incident surface 12 in at least one embodiment, which may also constitute about 65-75% of the total length of the optic 100. The beam splitter 13 may be positioned at any angle relative to the distal surface 18, such as in the range of 0-90°, and preferably at a 45° angle with respect to the distal surface 18, as shown in FIG. 2.

Figure 10:
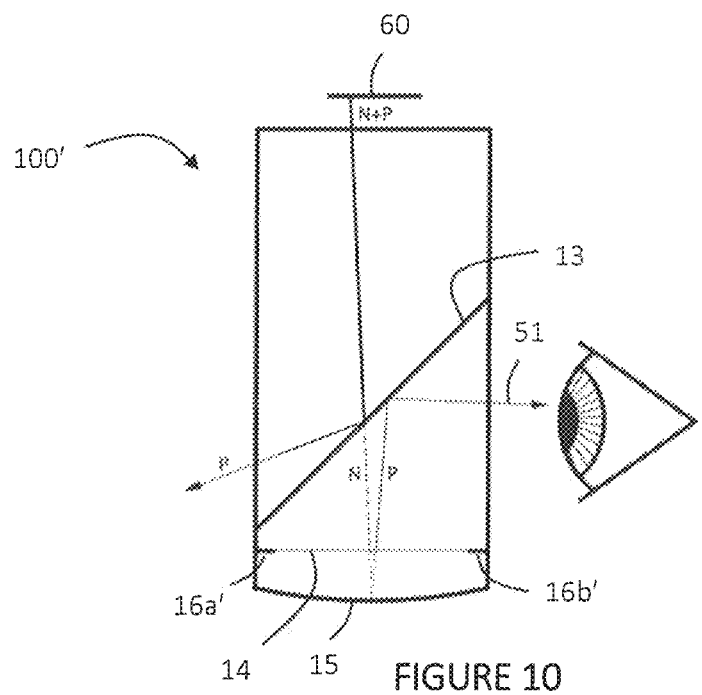
FIG. 10 is a diagram showing a ray trace of polarized light rays passing through an embodiment of the optic of FIG. 6 having a polarizing surface.

The beam splitter 13 may include a material that provides partial reflectance and partial transmission of light. For instance, the beam splitter surface 13 may include a beam splitter coating that provides 10%-90% reflectance of incident light rays, and 90%-10% transmission of incident light rays. In a preferred embodiment, the beam splitter coating may provide 50% reflectance and 50% transmission of light rays, such that half of incident projected light rays are reflected out of the optic 100 through the distal surface 18 and away from the viewer, and half of the projected light rays are transmitted through the beam splitter 13 and continue through the optic 100 as discussed below. In at least one embodiment, the beam splitter 13 may be selective for particular wavelengths of light, such as in the visible range of 400-700 nm or in the infrared (IR) spectrum. The beam splitter coating may be metallic (such as but not limited to aluminum) or non-metallic. The beam splitter 13 may also be non-polarizing. In at least one embodiment, such as shown in FIG. 10, the beam splitter 13 may be polarizing, such as provided by MOXTEK, Inc. of Orem, Utah, or other suitable polarizing coating or film. In certain embodiments, the beam splitter 13 may include a dielectric coating or film which has a different refractive index from the prisms 20, 30 on either side.

Figure 3:
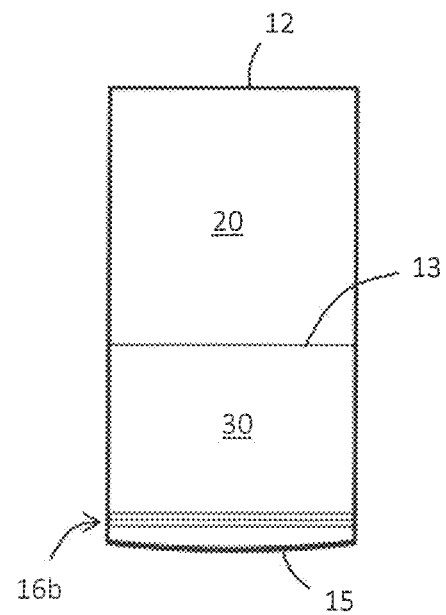
FIG. 3 is an elevation view of the proximal surface of the optic of FIG. 1.

The beam splitter 13 may be located internally within the prism 20 in embodiments having only one prism 20 comprising the optic 100. In other embodiments, the beam splitter 13 may be located between first and second prisms 20, 30, such as sandwiched between the prisms 20, 30 as shown in FIGS. 1-3. The beam splitter coating may be applied to or otherwise formed on a beam splitter surface 13 during construction of the optic 100, such as by direct application, deposition, or other suitable methods to either or both the first prism 20 or second prism 30 when building a composite optic 100.

The optic 100 further includes a reflective surface 15 spaced a preselected distance apart from the beam splitter 13, such as about 7 mm or about 31% of the total length of the optic 100 in at least one embodiment. The reflective surface 15 provides full or partial reflectance of light rays, like a mirror, and may be planar or curved. In at least one embodiment, as shown in FIGS. 1-13, the reflective surface 15 is slightly curved in a concave direction to focus the reflected rays. Any amount or degree of curvature may be employed. The particular amount of curvature of the reflective surface 15 is related to field of view, with less curvature providing a smaller field of view, and larger curvatures providing proportionally larger fields of view. For example, the reflective surface may have a radius of curvature in the range of 30-50 mm in some embodiments, although both larger and smaller curvatures are also contemplated, depending on at least the desired field of view, dimensions of the optic 100, length and angle of the beam splitter 13, and distance from the image source 60. The reflective surface 15 may include a coating to achieve or enhance reflectance, which may be any reflective material such as but not limited to metals like protected aluminum, chrome, and silver, to name a few. In some embodiments, the reflective surface 15 may form a boundary of the optic 100 opposite of the light incident surface 12.

In some embodiments, such as shown in FIGS. 6-10, the optic 100' may include a transmissive surface 14 located between the beam splitter 13 and reflective surface 15 and spaced apart a preselected distance from each. For instance, in at least one embodiment the transmissive surface 14 may be located about 5.4 mm from the center of the beam splitter 13, which may also constitute about 24% of the total length of the optic 100. Because the beam splitter 13 is preferably at an angle, the transmissive surface 14 may also be considered spaced about 0.8-0.9 mm from the nearest or lowest point of the beam splitter 13, which may also constitute a distance that is about 4% of the total optic 100 length. The transmissive surface 14 is preferably perpendicular to the distal and proximal surfaces 18, 19, as best shown in FIG. 7A. The transmissive surface 14 exhibits more than 90% transmission of light rays through it. Any coating or modifications applied or imparted to it, such as bonding or adhesive, are selected to minimize alteration of light rays passing therethrough. The benefit of having a transmissive surface 14 in certain embodiments will be explained in greater detail below, though it need not be present in all embodiments. The transmissive surface 14 may be formed by cutting a prism in two, forming a second prism 30 and third prism 40 as seen in FIG. 7A. When the optic 100' is assembled, the second and third prisms 30, 40 contact and are bonded to each other at the transmissive surface 14 and therefore share the transmissive surface 14.

The optic 100 also includes at least one baffle 16 that is configured to intercept and divert and/or absorb ghost rays 52 that correspond to and would otherwise form secondary or ghost images in a resulting projected image. In at least one embodiment, a pair of baffles 16 are included to reduce the ghost rays 52 originating from the distal and proximal edges, respectively, of an image source 60. The baffles 16 are located internally within the optic 100 and are located with precision to interfere with the ghost rays 52 to the exclusion of the projected image rays 51, thus reducing unwanted internal reflections that would result in ghost images while maintaining the integrity of the desired projected image. As used herein, "projected light rays" refer to the light rays provided by an image source 60 associated with the optic 100, as described in detail below, to delineate these light rays from other light rays that may be incident on the optic 100. The projected light rays include both image rays corresponding to a desired image to be projected and ghost rays corresponding to ghost images that obfuscate the desired image. Similarly, "desired projected image" or "projected image" refer to the desired image resulting from light rays projected from the image source 60, rather than other images that may incidentally be visible through the optic 100, and do not include ghost images.

To achieve a reduction in ghost images from the projected image, the baffles 16 are located between the beam splitter 13 and reflective surface 15 and spaced apart a preselected distance from each. In at least one embodiment, the baffles 16 are located closer to the reflective surface 15 than the beam splitter 13, though still spaced apart from the reflective surface 15. For instance, the baffles 16 may be spaced up to 3 mm from the reflective surface 15, though other distances are contemplated. The precise distance of the baffles 16 from the reflective surface 15 will depend on a number of factors, such as but not limited to the curvature of the reflective surface 15, the size of the image source 60, the refractive index of the prism(s) 20, 30, 40 in the optic 100, and the thickness of the optic 100 which is defined as the distance between the distal and proximal surfaces 18, 19. The space between the reflective surface 15 and the baffles 16 allow the ghost rays to pass through the beam splitter 13, bounce off of the reflective surface 15 and be intercepted by the baffles 16 before they can pass out of the optic 100 for viewing.

The baffles 16 are preferably located at the distal and proximal surfaces 18, 19 of the optic 100 and extend inwardly into the prism(s) of the optic 100. This terminal edge placement positions the baffles 16 where the ghost rays 52 will be internally reflected. However, the dimensions of the baffles 16 are also sufficiently small that they do not interfere with the projected image rays 51 internally reflected through the optic 100 and which ultimately provide the desired projected image. The depth of the baffles 16 are therefore minimal, such as penetrating up to about 0.5-1 mm into the interior of the optic 100.

Figure 7A:
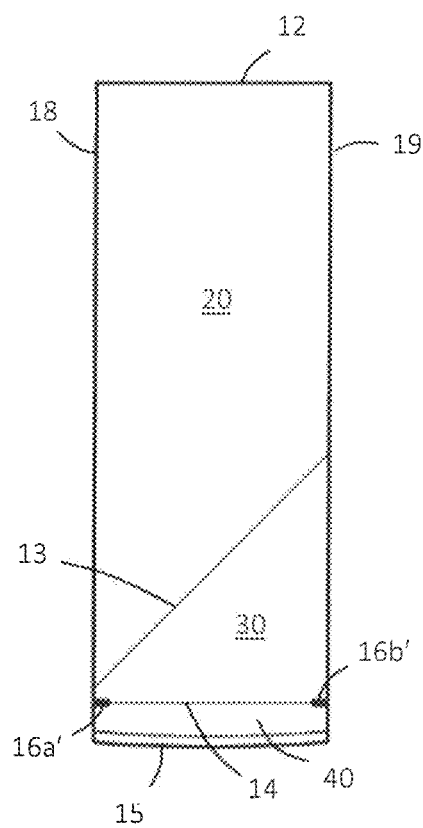
FIG. 7A is a side elevation view of the optic of FIG. 6.
Figure 7B:
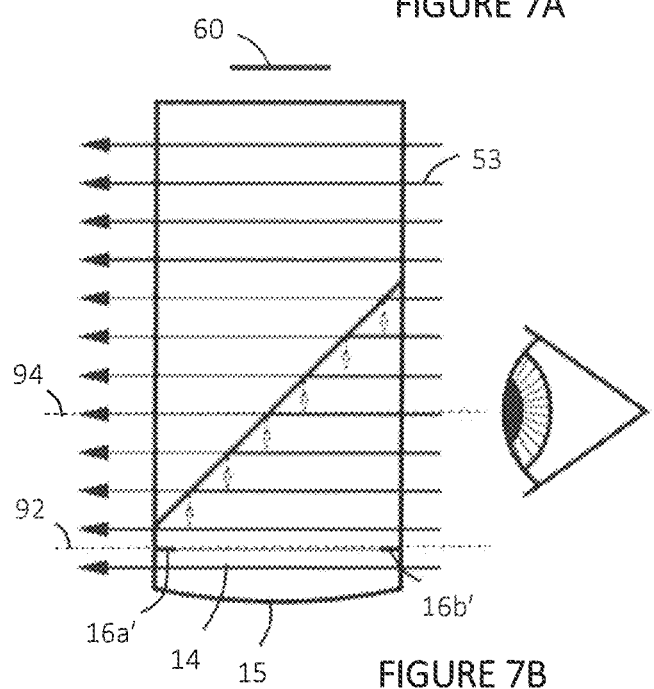
FIG. 7B is a diagram showing a ray trace of outside light rays passing through the optic of FIG. 6.

The height of the baffles 16 is also minimal. Each baffle 16 has a baffle axis 92 that extends through the center of the baffle 16 in the depth direction. The height of the baffle 16 is defined by the total deviation from the baffle axis 92 in both directions orthogonal to the width and depth of the baffle 16. Preferably, the height of the baffle 16 is less than 1 mm such that outside light rays 53 passing through the optic 100 parallel to a vision axis 94 which is disposed along a viewer's line of sight are not impeded by the baffle 16. Accordingly, the baffles 16 are also positioned so the baffle axis 92 is substantially parallel to the vision axis 94, as shown in FIG. 7B for example.

Figure 8:
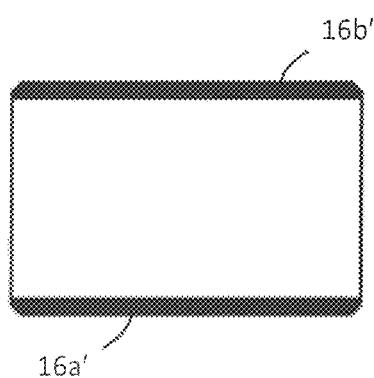
FIG. 8 is a top plan view of a transmissive surface of the optic of FIG. 6.

In certain embodiments, as shown in FIGS. 1-13, the baffles 16 may be formed in the second prism 30, or along the transmissive surface 14 between the second and third prisms 30, 40. In other embodiments having only a single prism 20, the baffles 16 may be formed in the single prism 20 and extend internally into the prism. Further, the baffles 16 may extend along at least a portion of the width of the optic 100, which is defined as a length of the distal or proximal surfaces 18, 19. Preferably, the baffles 16 may extend substantially the entire width of the optic 100, as depicted in FIGS. 3, 8 and 13.

The present invention contemplates different types of baffles that provide different benefits but overall very similar results. For instance, in at least one embodiment, as shown in FIGS. 1-3 and 5A-5B, diffusing baffles 16a, 16b are configured to intercept and scatter ghost rays. In some embodiments, there may be only a single diffusing baffle 16 located at either the distal surface 18 or proximal surface 19 of the optic 100. In other embodiments, as shown in FIGS. 1-3, there may be a first diffusing baffle 16a located at the distal surface 18 and a second diffusing baffle 16b located at the proximal surface 19 of the optic 100. The diffusing baffles 16a, 16b may be formed in the optic 100 by any suitable method, such as but not limited to by being cut, ground, or molded into the distal and proximal surfaces 18, 19 of the optic 100, respectively. The diffusing baffles 16a, 16b may have any shape, such as but not limited to triangular, square, rectangular, circular, ovoid, pyramidal or asymmetric, and may be the same or different shape from one another. FIGS. 1-3 show triangular diffusing baffles 16a, 16b. The shape of the diffusing baffles 16a, 16b may be dictated by the instrument forming the diffusing baffles 16a, 16b in the optic 100, such as a saw blade. In other instances, diffusing baffles 16a, 16b may be precision cut by a laser or other similar cutting instrument. Regardless of shape, the surfaces of the diffusing baffles 16a, 16b have irregularities or unevenness sufficient to diffuse or scatter light striking the diffusing baffles 16a, 16b. These irregularities or unevenness may be formed in the surface of the diffusing baffles 16a, 16b by any suitable method, such as grinding, cutting, filing, molding, or other methods.

As shown in the embodiment of FIGS. 1-3, the diffusing baffles 16a, 16b may be formed in the second prism 30 of the optic 100, though in other embodiments the diffusing baffles 16a, 16b may be formed in the first prism 20. Regardless of which prism in which they are formed, the diffusing baffles 16a, 16b are located at a preselected distance between the beam splitter 13 and the reflective surface 15. For instance, in at least one embodiment, the diffusing baffles 16a, 16b may be formed up to 3 mm distant from the reflective surface 15. In other embodiments, the diffusing baffles 16a, 16b may be located a distance from the reflective surface 14 that is up to 11-12% of the total length of the optic 100, as one illustrative example.

The diffusing baffles 16a, 16b may have a depth of up to 1 mm, and therefore may penetrate up to 1 mm into the optic 100" from the surfaces 18, 19. For example, each diffusing baffle 16a, 16b may have the same depth or different depths from one another. In a preferred embodiment, the diffusing baffles 16a, 16b may each have a depth of about 0.5 mm, constituting about 5.5% of the depth of the optic 100. The depth of the diffusing baffles 16a, 16b dictates how much light they will intercept and disperse. Therefore, a diffusing baffle 16a, 16b with too great a depth will impede the projected image rays corresponding to the desired projected image to be displayed, and too shallow a depth will be insufficient to intercept a meaningful amount of ghost rays.

The diffusing baffles 16a, 16b extend into the optic 100 along the baffle axis 92, which is substantially parallel to the vision axis 94 of a viewer when using the optic 100, as shown in FIGS. 5A and 5B. Accordingly, the diffusing baffles 16a, 16b are also substantially parallel to at least some of the outside light rays 53 (not shown) passing through the optic 100 between the proximal 19 and distal 18 surfaces by which a viewer would see their surroundings. The diffusing baffles 16a, 16b have a minimal height, such as less than 0.5 mm, to avoid obstructing outside light rays 53 that convey images of the surrounding environment through the optic 100 while simultaneously intercepting and scattering the perpendicular or obliquely incident ghost rays 52a, 52b.

Figure 4A:
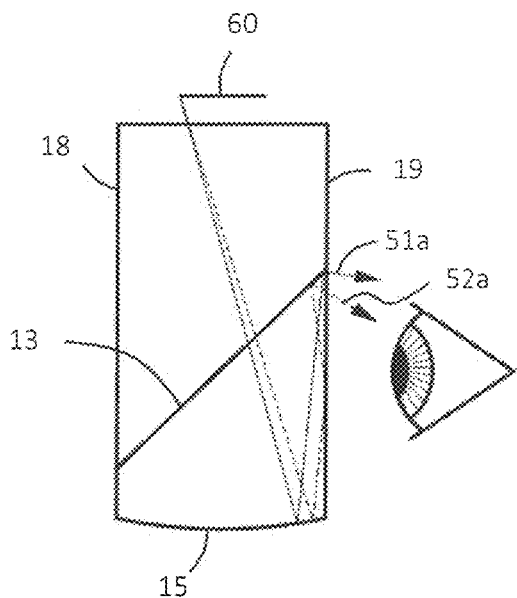
FIG. 4A is a diagram showing a ray trace of image rays and ghost rays originating from a distal edge of an image source passing through an optic of the prior art with no baffles.
Figure 4B:
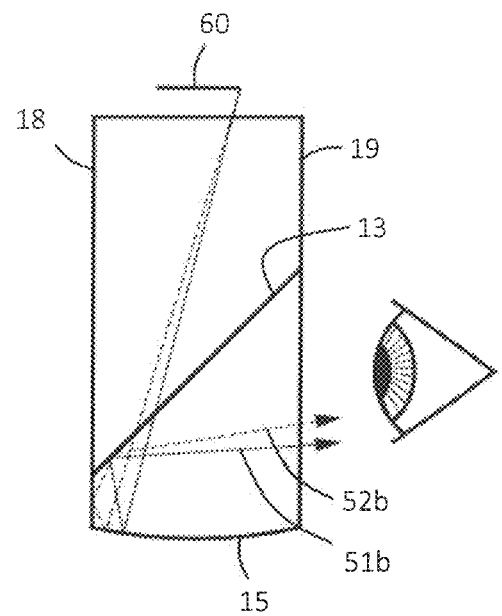
FIG. 4B is a diagram showing a ray trace of image rays and ghost rays originating from a proximal edge of an image source passing through the optic of the prior art with no baffles.

To show the impact of the baffles 16 of the optic 100 of the present invention, FIGS. 5A-5B, 7B and 9A-10 depict the path of light rays through various embodiments of the optic 100 of the present invention as discussed herein, as compared to FIGS. 4A-4B which depict the path of light rays through prior optics lacking any baffles. It should be appreciated that these ray traces are oversimplifications provided for clarity to illustrate the salient features of optic 100 presented here, and intentionally do not show the full continuum of light that would emit from an image source 60, which would be unnecessarily complicated. Similarly, the eye shown in these Figures is representative of the position of a viewer and are provided for illustrative purposes and is not to scale.

Figure 14:
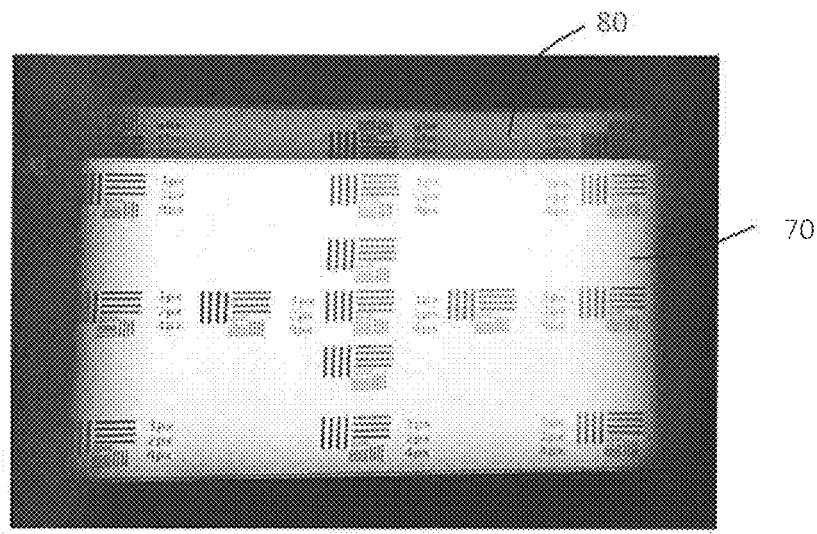
FIG. 14 is a photograph of an illustrative example of a resulting image seen through the optic of FIGS. 4A and 4B having no baffles, showing ghost images.

As depicted in FIGS. 4A and 4B showing the prior art, in the absence of any baffles, projected image rays 51a, 51b and ghost rays 52a, 52b from distal and proximal edges emitted from an image source 60 enter the optic through a projected light incident surface 12, are partially reflected and partially pass through a beam splitter 13, reflect off the reflective surface 15 inwardly back into the optic, and out the proximal surface 19 to the viewer. Accordingly, ghost images 80 are formed along with the resulting projected image 70, as shown in FIG. 14. Specifically, first projected image rays 51a and first ghost rays 52a emanate from a distal edge of the image source 60, as shown in FIG. 4A, proceed through the beam splitter 13, reflective surface 15, back to the beam splitter 13, and into the viewer's eye through the proximal surface 19 of the optic. Therefore, both the desired projected image 70 and ghost image 80 are formed by these projected light rays. These first ghost rays 52a create a ghost image 80 that is inverted from the desired projected image 70 and at about 7% the light intensity as the desired image 70, as seen in FIG. 14. At the same time, second projected light rays 51b and second ghost rays 52b emanate from a proximal edge of the image source 60, as shown in FIG. 4B, proceed through the beam splitter 13, reflective surface 15, back to the beam splitter 13, and into the viewer's eye through the proximal surface 19 of the optic. These second ghost rays 52b result in a ghost image 80 that has the same orientation as the desired projected image 70, but has about 2-3% the light intensity as the desired image 70. When the first and second ghost rays 52a, 52b overlap with the first and second projected image rays 51a, 51b, they produce a resulting desired projected image 70 that is partially obscured by the ghost images 80, which is blurred, and reduced in clarity. An illustrative example is shown in FIG. 14.

Figure 15:
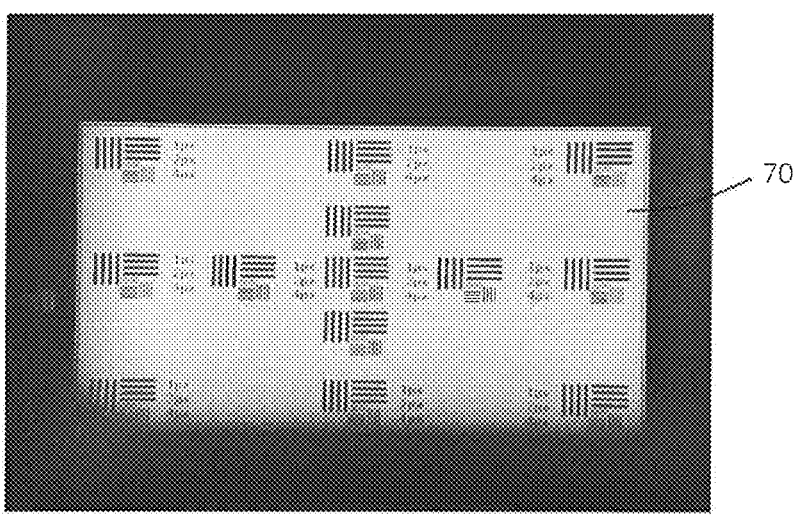
FIG. 15 is a photograph of an illustrative example of a resulting image seen through the optic of FIG. 1 showing a reduction in ghost images.

However, when diffusing baffles 16a, 16b of the present invention are included, first ghost rays 52a originating from the distal edge of the image source 60 and reflecting off the reflective surface 15 are intercepted by diffusing baffle 16b at the proximal surface 19 of the optic 100, as shown in FIG. 5A. Similarly, second ghost rays 52b originating from the proximal edge of the image source 60 reflecting off the reflective surface 15 are intercepted by diffusing baffle 16a at the distal surface 18 of the optic 100, as shown in FIG. 5B. The diffusing baffles 16a, 16b intercept and scatter the ghost rays 52a, 52b before they can exit the optic 100 through the proximal surface 19. The ghost rays 52a, 52b are therefore dispersed in the resulting desired projected image 70 and are not perceptible to the viewer. This reduces reflections or ghost images 80 presented to a viewer, therefore results in a clearer desired image 70, shown in FIG. 15, as compared to when viewed through an optic without baffles as in FIG. 14. Because of the scattering of light, the diffusing baffles 16a, 16b also create a glow effect in the resulting desired projected image 70 presented to the viewer, which may also appear brighter than resulting images without baffles.

In other embodiments, as shown in FIGS. 6-10, the optic 100' may include light absorbing baffles 16a', 16b'. Such light absorbing baffles 16a', 16b' may be a coating, paint, film, or other opaque material that absorbs light, such as at least 99% of incident light in the relevant wavelengths. In certain embodiments, the light absorbing material may absorb at least 75% of incident light. Various levels of opacity in the light absorbing material are contemplated, though greater opacity is generally desired. In at least one embodiment, the light absorbing material may absorb specific wavelengths of light, such as in the visible light or IR ranges, depending on what type of light is intended to be blocked. Any coating or material that absorbs the relevant desired wavelength of light is contemplated, such as black paint, any opaque black coating, and metals as a few non-limiting examples.

Figure 6:
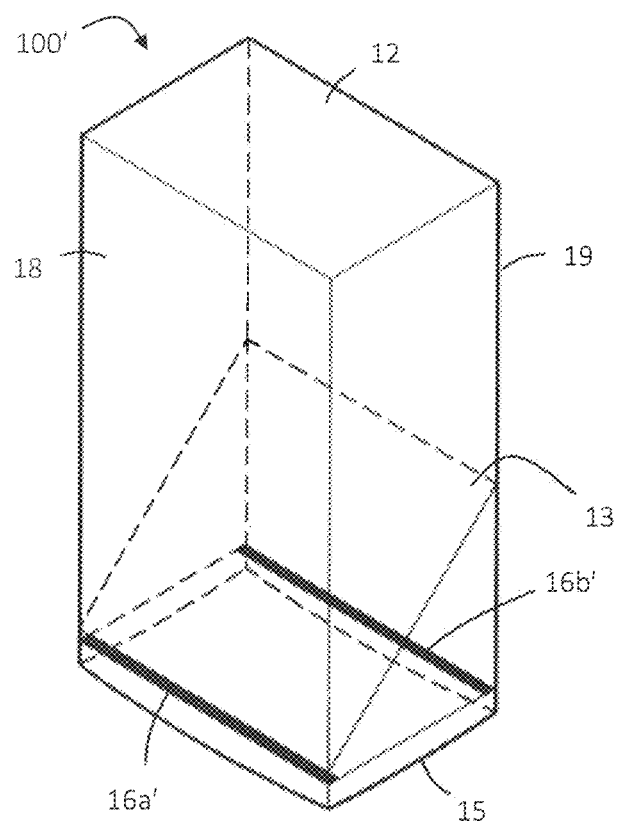
FIG. 6 is an isometric view of a second embodiment of the optic of the present invention having light absorbing baffles.

The light absorbing baffles 16a', 16b' may be applied to at least one of the surfaces of the prisms of the optic 100', preferably an internal surface. For instance, as shown in FIGS. 6 and 7A, the optic 100' may include a first prism 20, second prism 30 and third prism 40. In practice, the second and third prisms 30, 40 may be formed by cutting one prism into two pieces, in order to provide an internal surface on which to apply the light absorbing baffles 16a', 16b' between the beam splitter 13 and reflective surface 15. This forms a transmissive surface 14 when the second and third prisms 30, 40 are reassembled together in the final optic 100'. This transmissive surface 14 is therefore preferably index-matched to the second and third prisms 30, 40 and does not appreciably bend or refract light passing therethrough. It is preferably completely or near completely transmissive. The light absorbing baffles 16a', 16b' are applied to this transmissive surface 14 prior to assembling the compound optic 100', such as by a strip, painted, or deposited to the second prism 30 or third prism 40 or both, since the transmissive surface 14 exists at the junction of these two prisms. Accordingly, the light absorbing baffles 16a', 16b' are exceedingly thin, such as paper thin, and do not affect the contact between the second and third prisms 30, 40 when joined. Similarly, since the baffle axes 92 of the light absorbing baffles 16a', 16b' are coextensive with the transmissive surface 14, the light absorbing baffles 16a', 16b' do not interfere with the passage of outside light rays 53 through the optic 100' or the viewer's vision axis 94, as shown in FIG. 7B.

As with other types of baffles 16, the light absorbing baffles 16a', 16b' are positioned along at least one, and preferably both, edges of the transmissive surface 14 at the distal and proximal surfaces 18, 19, as shown in FIGS. 7A and 8. In at least one embodiment, the light absorbing baffles 16a', 16b' span at least a portion of the width of the transmissive surface 14, preferably the entire width thereof, as in FIG. 8, where the width is defined by the dimensions of either the distal or proximal surfaces 18, 19. Further, the light absorbing baffles 16a', 16b' extend inwardly into the optic 100', such as by up to 1 mm each. Preferably, each light absorbing baffles 16a', 16b' extends up 0.5 mm into the optic 100' along the transmissive surface 14, which may constitute about 5.5% of the depth of the transmissive surface 14, or about 11% of the depth of the transmissive surface 14 when taken together in one embodiment. As with the other types of baffles 16, the light absorbing baffles 16a', 16b' are positioned between the reflective surface 15 and the beam splitter 13 and spaced apart from both. For instance, in at least one embodiment, the light absorbing baffles 16a', 16b' may be positioned up to 3 mm from the reflective surface 15.

Figure 9A:
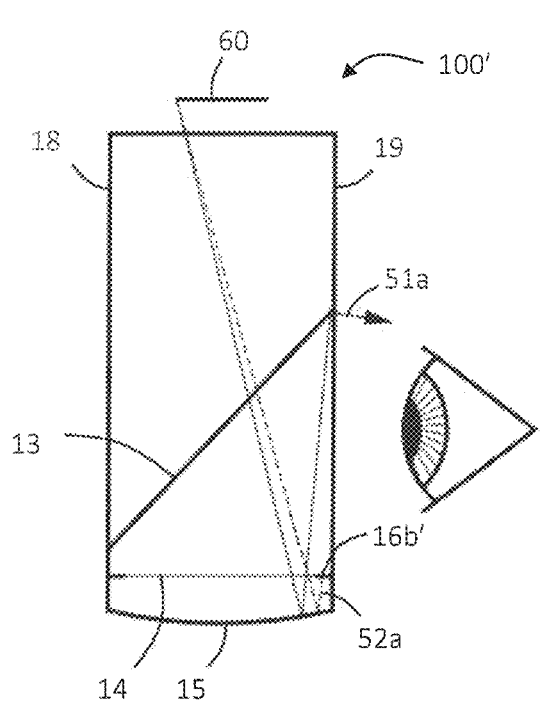
FIG. 9A is a diagram showing a ray trace of image rays and ghost rays originating from a distal edge of a light source passing through the optic of FIG. 6, blocking ghost rays.
Figure 9B:
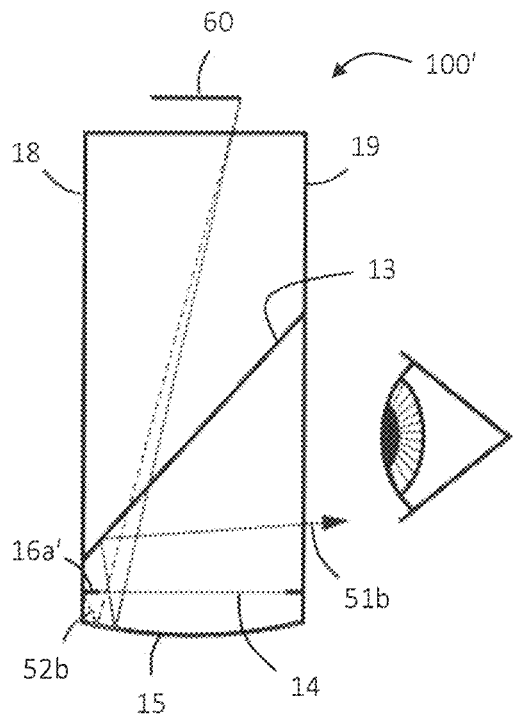
FIG. 9B is a diagram showing a ray trace of image rays and ghost rays originating from proximal edge of a light source passing through the optic of FIG. 6, blocking ghost rays.
Figure 16:
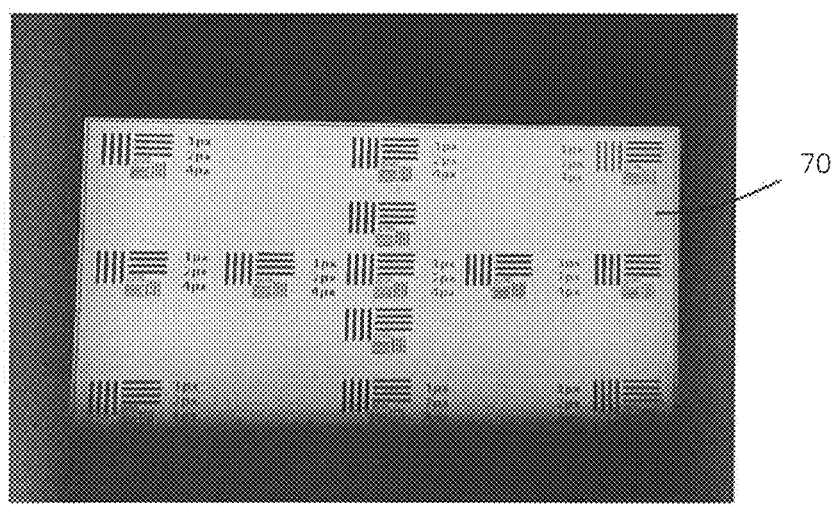
FIG. 16 is a photograph of an illustrative example of a resulting image seen through the optic of either FIG. 6 or 11 showing a reduction in ghost images.

With reference to FIGS. 9A-9B, inclusion of light absorbing baffles 16a', 16b' in the optic 100' absorbs light from ghost rays 52a, 52b that would cause ghost images 80, thereby preventing their reflection off the beam splitter 13 and to the viewer's eye. Specifically, first ghost rays 52a originating at the distal edge of the light source 60 are absorbed or blocked by the light absorbing baffle 16b' at the proximal surface 19 of the optic 100'. Similarly, second ghost rays 52b originating at the proximal edge of the light source 60 are absorbed or blocked by the light absorbing baffle 16a' at the distal surface 18 of the optic 100'. The light absorbing baffles 16a', 16b' do not interfere with the projected image rays 51a, 51b. The resulting desired projected image 70 is markedly reduced in ghost images 80 and is clearer and brighter. An illustrative example is shown in FIG. 16.

The use of light absorbing baffles 16a', 16b' may be particularly useful when light polarization is also desired. For instance, and with reference to FIG. 10, when the beam splitter 13 is a polarizing beam splitter 13, only light of a particular rotation is allowed to pass through. A polarizing transmissive surface 14' may therefore be employed to further rotate the light as it passes through. This polarizing transmissive surface 14' may be made of a polarizing material, such as a plate or film. In at least one embodiment, the polarizing transmissive surface 14' may be a quarter wave plate which rotates the light a quarter of a wavelength with each pass through the polarizing transmissive surface 14', converting incoming plane polarized light into circular polarization, such as described in U.S. Pat. No. 7,133,207 which is incorporated by reference in its entirety. One illustrative example includes the achromatic AQWP2 quarter waveplate, made by Bolder Vision Optik of Boulder, Colo., although other waveplates and equivalent structures are also contemplated.

With reference to FIG. 10, when projected light containing both N and P polarizations hits the beam splitter 13, the P polarized light may be reflected off the beam splitter 13 and the N polarized light may be transmitted through the beam splitter 13. When the N polarized light passes through the polarizing transmissive surface 14', it is rotated a quarter of a turn or wavelength. The light then reflects off the reflective surface 15 and passes through the polarizing transmissive surface 14' a second time, again rotating another quarter of a turn or wavelength. This resulting light now has a P polarization. Therefore, light that has one polarization when transmitted through the beam splitter 13 (such as N) will have an opposite polarization (such as P) when being transmitted back to the beam splitter 13 from the polarizing transmissive surface 14', as shown in FIG. 10. Though showing the rotation of N to P polarized light, it should be appreciated that the inverse is also contemplated in which the beam splitter 13 permits the passage of P polarized light and the polarizing transmissive surface 14' rotates this light to an N polarization for viewing. The polarizing transmissive surface 14' may rotate the light by any amount, such as but not limited to a quarter or one half of a turn or wavelength. The polarizing transmissive surface 14' may be a quarter wave plate or a half wave plate, and may convert the light to linear polarization, circular polarization, or elliptical polarization. In a preferred embodiment, the polarizing transmissive surface 14' is a quarter wave plate. It may therefore be beneficial to use light absorbing baffles 16a', 16b' with an optic 100' having polarization, since a wave plate or other similar coating or film would need to be applied to make a polarizing transmissive surface 14'.

Figure 11:
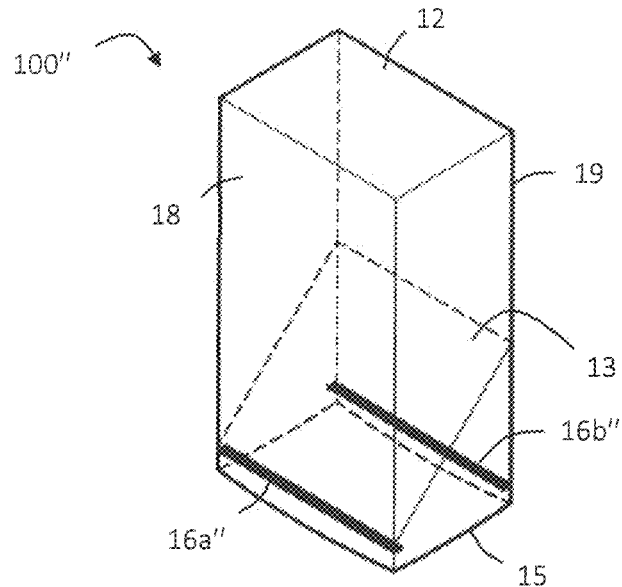
FIG. 11 is an isometric view of a third embodiment of the optic of the present invention having combination baffles.
Figure 12:
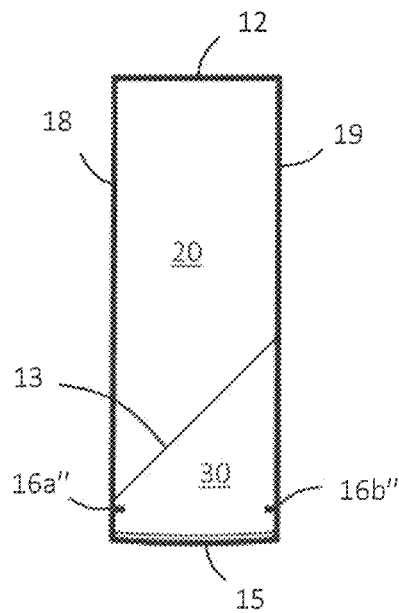
FIG. 12 is a side elevation view of the optic of FIG. 11.
Figure 13:
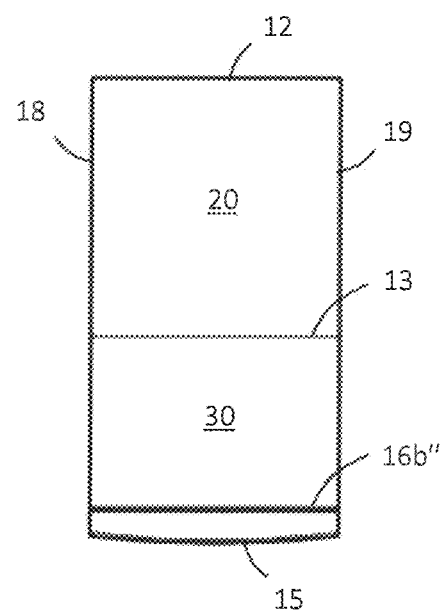
FIG. 13 is an elevation view of the proximal surface of the optic of FIG. 11.

In at least one other embodiment, as depicted in FIGS. 11-13, the optic 100" may include combination baffles 16a", 16b" which combine the features of the previously discussed baffles. For example, the combination baffles 16a", 16b" may include diffusing structures, such as notches or grooves discussed above and formed in the optic 100" such as by cutting or grinding, which are then filled in with light absorbing material as discussed above which absorb or block incident light. Such combination baffles 16a", 16b" provide the ease of manufacture of diffusing baffles 16a, 16b with the light blocking features of light absorbing baffles 16a', 16b', thus also preventing the "glow" effect seen with diffusing baffles 16a, 16b. Accordingly, the resulting desired projected image 70 and reduction in ghost images 80 with combination baffles 16a", 16b" may be similar to those of light absorbing baffles 16a', 16b' seen in FIG. 16, and the internal reflections of projected image rays 51a, 51b and ghost rays 52a, 52b through the optic 100" may also be similar to those shown in FIGS. 9A and 9B. The combination baffles 16a", 16b" provide the added benefit of avoiding having to entirely cut or cleave a prism to introduce the baffles.

The present invention is also directed to an assembly 200 having an optic 100, 100', 100" as described above incorporated into a wearable vision system 230, which is preferably a near-eye system. For ease of reference, optic 100 will be referred to hereinafter, though it should be understood that any embodiment of the optic 100, 100', 100" may be used. The assembly 200 may be an HMD of any type, and may be used for virtual reality, augmented reality, and other applicable image viewing systems.

Figure 17:
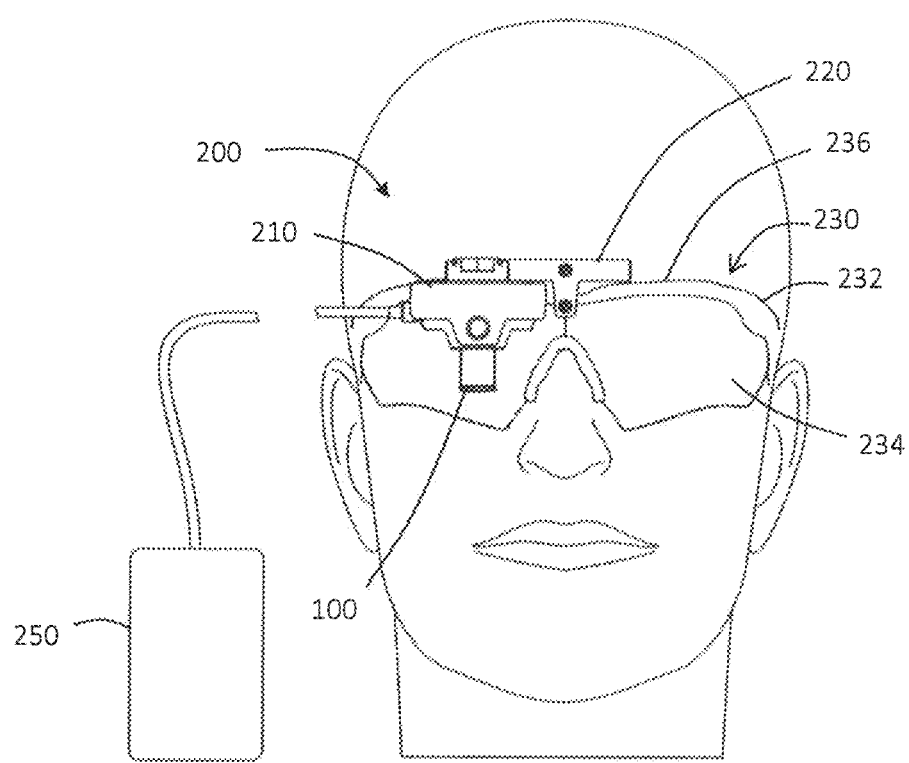
FIG. 17 is a front view of an illustrative embodiment of the assembly of the present invention.
Figure 18:
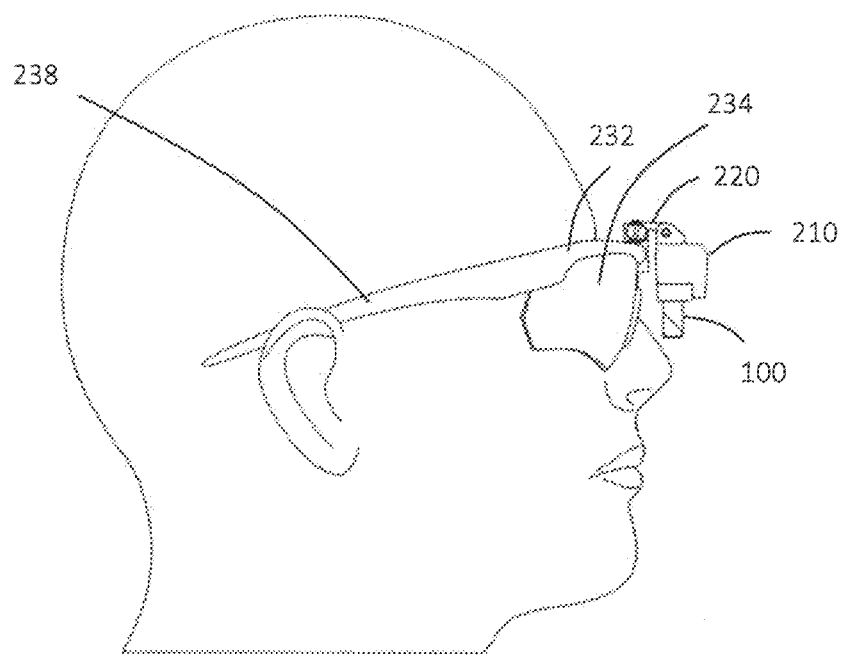
FIG. 18 is a side view of the assembly of FIG. 17.
Figure 19:
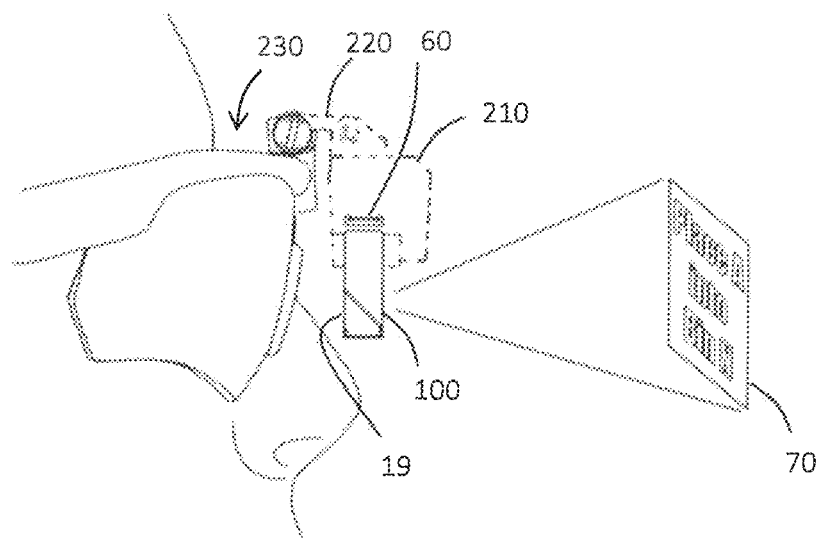
FIG. 19 is a side detail view of FIG. 18 showing certain features of the interior of the housing.

The wearable vision system 230 is made up of a frame 232 and optionally at least one lens 234, such as shown in FIGS. 17-19. The wearable vision system 230 may therefore be any type of system that allows for viewing when worn, such as but not limited to glasses, sunglasses, safety glasses, goggles, visors and helmets. Accordingly, the frame 232 may constitute portions which hold the lens(es) 234 in place as well as a crossbar 236 extending across the front of the face when worn, such as between lenses 234, an arm(s) 238 disposable over a wearer's ear(s), and/or a strap (not shown) extending around a wearer's head. In certain circumstances, the frame 232 may connect the assembly 200 to a larger head covering, such as a helmet or visor.

As shown in FIGS. 17-19, the assembly 200 positions the optic 100 in the line of sight of at least one eye of the viewer when worn, such that the projected desired image 70 is presented within the viewer's eyebox for viewing. As used herein, the terms "viewer" and "wearer" may be used interchangeably to refer to a person who uses the assembly 200 to view a desired projected image 70. In at least one embodiment, such as shown, the assembly 200 may include a single optic 100 positioned in front of one eye of the wearer. In other embodiments, the assembly 200 may include multiple optics 100, which may be the same or different from one another, each positioned in the line of sight of a different eye of the viewer. Accordingly, the assembly 200 may be monocular or binocular.

The assembly 200 may further include a housing 210 which retains the optic 100 and associated image source 60 in fixed relation relative to one another. This fixed relation is precise since deviation may offset the calculated trajectory of the projected light rays 51 and ghost rays 52 through the optic 100, and therefore misalign the baffles 16 with the ghost rays 52 and impair the functioning of the optic 100. Accordingly, the image source 60 is held in the housing 210 in a fixed position relative to the optic 100 so that light projected from the image source 60 enters the optic 100 with precision. As best shown in FIG. 19, the image source 60 may be entirely contained within the housing 210 and the optic 100 may extend from the housing 210 such that the proximal surface 19 may be positioned in front of the wearer's eye for viewing the projected image. At least a portion of the optic 100 may be retained within the housing 210, though in some embodiments the optic 100 may be affixed to the housing 210 from a terminal edge thereof and may align with an aperture in the housing 210 to receive projected light from an associated image source 60 within the housing 210. The housing 210 may be any hardware made of any suitable material and in any configuration to retain the image source 60 and optic 100 in fixed relation to one another. For example, the housing 210 may be made of plastic or metallic components, and combinations thereof.

The image source 60 may be any type of display that emits light and projects an image, such as but not limited to an emissive, transmissive, transflective or reflective display. For example, the image source 60 may be an LCD, OLED, DLP, or LCOS display, and may be backlit or frontlit as appropriate. In at least one embodiment, as in FIGS. 17-19, the image source 60 may be an OLED microdisplay as used in HMDs. In certain embodiments, the image source 60 may be on the micro-, pico-, or nano-scale. Further, the image source 60 may provide static images (such as but not limited to still photographs, images and text) or dynamic images (such as but not limited to videos). The image source 60 may include a projector (such as but not limited to a picoprojector) and at least one light source (such as but not limited to LED(s)). The light source 60 may generate light by any method, including but not limited to electrically, photonically and chemically.

The image source 60 is in electrical communication with a control unit 250, as illustrated in FIG. 19. The control unit 250 includes at least a processor and preferably memory to provide images to the image source 60 for presentation to the viewer. In certain embodiments, the control unit 250 includes a processor that conveys images stored in memory remotely, such as from a cloud-based platform accessed by the control unit 250 for presentation. In other embodiments, the control unit 250 may include memory that stores various images locally for selection. Various images, both static and dynamic, may be stored in the memory, be it locally within the control unit 250 or remotely for access and presentation by the control unit 250. When an image is selected, the processor sends the selected image to the image source 60 for display. Accordingly, the control unit 250 may also have a user interface component through which a user, who may or may not be the wearer of the assembly 200, can select images for viewing and/or interact with the images presented through the optic 100 through command controls. Such user interface may have any mechanism through which to select and interact with the image, including but not limited to a touchscreen, touchpad, button(s), keyboard and joystick. The control unit 250 may be any computing device, such as but not limited to a computer, laptop, tablet, or smart phone. Accordingly, in at least one embodiment the control unit 250 may be separate from the remainder of the assembly 200, as in FIG. 19. In other embodiments, however, the control unit 250 may be integrated into a wearable vision system 230, such as a portion of the frame 232, along an arm 234 of the frame 232, or even lens 240. Accordingly, in such embodiments the user interface may include button(s) integrated into the frame 232 for selection and operation, or may include components in the frame 232 and/or lens 234 to register eye motion or verbal commands for use of the control unit 250.

The control unit 250 is electrically connected to the image source 60. This connection may be a wired or wireless connection. For example, in at least one embodiment the control unit 250 may be physically connected to the housing 210, such as through a wire or cord, such as but not limited to USB, HDMI, VGA and composite. Such connection may be through any suitable communications configuration or protocol, such as but not limited to USB, ethernet, HDMI, VGA protocols. In other embodiments, the control unit 250 may connect to the image source 60 through wireless communication, such as short-range communication through Bluetooth™, radio-frequency identification (RFID), Wi-Fi, infrared data association (IrDA) and other similar forms of near field communication.

The assembly 200 also includes a mounting unit 220 affixing and interconnecting the housing 210 to the wearable vision system 230, as shown in FIGS. 17-19. The mounting unit 220 may include attachment members which may be permanent or selectively attachable and releasable. In such embodiments, the housing 210 may be selectively attached to and removed from the wearable vision system 230 as desired, so that the wearable vision system 230 may be used with or without the remainder of the assembly 200. This may be particularly useful when the wearable vision system 230 is a pair of glasses or sunglasses that the wearer typically uses for reasons unrelated to the assembly 200, such as for normal vision, reading, or near-vision work. Accordingly, in at least one embodiment, the mounting unit 220 may be a clip that attaches to and is removable from the wearable vision system 230 with resiliently deformable arms and/or a frictional fit. In some embodiments, the mounting unit 220 may include screws, pins, and other selectively removable attachment members for the selective attachment and release of the housing 210.

In at least one embodiment, the mounting unit 220 may be configured to adjust said assembly 200 between an operative mode in which the optic 100 is positioned in the line of sight of the viewer and at least one inoperative mode in which the optic 100 is moved away from the viewer's line of sight. For instance, the mounting unit 220 may include a hinge or pivot point such that the housing 210 may be rotated out of the field of view of the wearer, such as by flipping the housing 210 up above the wearable vision system 230 in an inoperative mode. Such embodiments may be particularly useful if viewing through the optic 100 is needed with some frequency but not all the time, such that removal of the housing 210 from the wearable vision system 230 may not be needed or desired but selective viewing through the optic 100 may still be easily achieved. An attachment member such as a pin may act as a pivot point about which such rotation may be accomplished. In certain embodiments, the optic 100 may be moved out of the field of view by other methods of movement, such as by rotation or translational movement of the housing 210 to either side of the line of sight. Accordingly, the housing 210 may be rotated or translationally slid to the side of the wearer's face or over their nose in various inoperative modes. Accordingly, the mounting unit 220 may also include a track(s) for translational movement of the housing 210 relative to the wearable eye system 230.

The mounting unit 220 may attach to any point(s) along the frame 232 of the vision system 230. In at least one embodiment, as shown in FIGS. 17-19, the mounting unit 220 attaches to the crossbar 236 of the frame 232, such that the optic 100 may be positioned in front of the eye from above. This orientation is minimally invasive and permits an unoccluded view through the optic 100. It also beneficially does not occlude the peripheral vision of the wearer. In other embodiments, however, the mounting unit 220 may attach to an arm(s) 238 or side of the frame 232. In such embodiments, the optic 100 may present to the eye of the viewer from the side of the field of vision. In some embodiments, the housing 210 itself may be integrated into part of the frame 232, such as a portion of the crossbar 236 or arm(s) 238. In certain embodiments, the control unit 250 and/or buttons for operating the control unit 250 may be integrated into the frame 232, such as in an arm(s) 234. Regardless of placement and attachment to the frame 232, in a preferred embodiment the optic 100 and housing 210 do not occlude the vision of the wearer.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:

1. An optic, comprising:
    a beam splitter within said optic configured to (i) receive projected light rays corresponding to a desired projected image to be presented to a user for viewing and a ghost image that obfuscates said desired projected image, and (ii) selectively transmit at least a portion of said projected light rays;
    a reflective surface within said optic configured to receive said projected light rays transmitted from said beam splitter and reflect said projected light rays inwardly to said beam splitter; and
    at least one baffle having a diffusing structure with surface irregularities configured to scatter said projected light rays corresponding to said ghost image, said at least one baffle disposed within said optic between said beam splitter and said reflective surface, positioned to intercept said projected light rays corresponding to said ghost image from reflection by said reflective surface to said beam splitter.

2. The optic as recited in claim 1, wherein said optic is a see-through optic.

3. The optic as recited in claim 1, wherein said at least one baffle is spaced apart a predetermined distance from said beam splitter and said reflective surface.

4. The optic as recited in claim 3, wherein said predetermined distance between said at least one baffle and said reflective surface is based on at least one of: a curvature of said reflective surface, an area of a projected light incident surface receiving said projected light rays, a refractive index of said optic, and a thickness of said optic, wherein said thickness is defined by a distance between a distal surface and an opposite proximal surface of said optic, and wherein said proximal surface of said optic is positioned closer to a viewer when in use.

5. The optic as recited in claim 3, wherein said predetermined distance between said at least one baffle and said reflective surface is up to 3 mm.

6. The optic as recited in claim 1, wherein said at least one baffle extends inwardly from an exterior surface of said optic.

7. The optic as recited in claim 1, wherein said at least one baffle includes a baffle axis defined along a center of said at least one baffle, said at least one baffle positioned so said baffle axis is at an oblique angle or perpendicular angle relative to said projected light rays and substantially parallel to an optical axis defined along a line of sight of a viewer.

8. The optic as recited in claim 1, wherein said at least one baffle extends along at least a portion of a width of said optic, wherein said width is defined by a distal surface or a proximal surface of said optic, wherein said proximal surface of said optic is positioned closer to a viewer when in use.

9. The optic as recited in claim 1, further comprising a plurality of baffles, wherein a first baffle extends inwardly from a distal surface of said optic and a second baffle extends inwardly from a proximal surface of said optic, wherein said proximal surface of said optic is positioned closer to a viewer when in use.

10. The optic as recited in claim 1, wherein said at least one baffle further includes light absorbing material configured to absorb said projected light rays corresponding to said ghost image.

11. The optic as recited in claim 10, wherein said light absorbing material is configured to absorb at least 99% of said projected light rays corresponding to said ghost image and is selected from the group consisting of paint, film, and coating.

12. The optic as recited in claim 11, wherein said light absorbing material is further configured to selectively absorb predetermined wavelengths of light.

13. The optic as recited in claim 1, wherein said projected light rays include (i) image rays corresponding to said desired projected image and (ii) ghost rays corresponding to said ghost image, wherein said at least one baffle is positioned and configured to selectively intercept said ghost rays from reflection by said reflective surface to said beam splitter to the exclusion of said image rays.

14. The optic as recited in claim 1, further comprising a transmissive surface positioned between said beam splitter and said reflective surface and configured to transmit said projected light rays.

15. The optic as recited in claim 14, wherein said beam splitter is a polarizing beam splitter configured to reflect said projected light rays of a first polarization and transmit said projected light rays of a second polarization, and further comprising a polarizing surface at said transmissive surface, said polarizing surface configured to rotate said projected light rays of said second polarization when passing therethrough.

16. An assembly comprising said optic as recited in claim 1 and a vision system configured to position said optic along an optical axis defined by a line of sight of a viewer.

17. The assembly as recited in claim 16, wherein said vision system is one of glasses, sunglasses, safety glasses, goggles, visor, and helmet.

18. The assembly as recited in claim 16, further comprising an image source configured to project said projected light rays to a projected light incident surface of said optic, and a housing configured to retain said optic and said image source in fixed relation relative to one another.

19. The assembly as recited in claim 18, further comprising a mounting unit configured to attach said housing to said vision system.

20. The assembly as recited in claim 19, wherein said mounting unit is configured to selectively attach said housing to said vision system.

21. The assembly as recited in claim 19, wherein said mounting unit is selectively adjustable to position said housing between (i) an operative mode where said optic is aligned with said optical axis and (ii) an inoperative mode where said optic is misaligned with said optical axis.

22. The assembly as recited in claim 19, wherein said vision system includes a frame and said mounting unit is attachable to said frame.

23. The assembly as recited in claim 18, further comprising a control unit in electrical communication with said image source, said control unit having a processor and configured to provide at least one image to said image source to project said projected light rays corresponding to said at least one image.

24. The assembly as recited in claim 23, further comprising a user interface in electrical communication with said control unit configured to receive input from a user corresponding to selection of said at least one image, said processor of said control unit further configured to receive said input from said user interface.

* * * * *